US011199983B2

(12) United States Patent
Frid et al.

(10) Patent No.: US 11,199,983 B2
(45) Date of Patent: Dec. 14, 2021

(54) APPARATUS FOR OBSOLETE MAPPING COUNTING IN NAND-BASED STORAGE DEVICES

(71) Applicant: Western Digital Technologies, Inc., San Jose, CA (US)

(72) Inventors: Marina Frid, Jerusalem (IL); Igor Genshaft, Bat Yam (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 75 days.

(21) Appl. No.: 16/538,619

(22) Filed: Aug. 12, 2019

(65) Prior Publication Data

US 2021/0048948 A1 Feb. 18, 2021

(51) Int. Cl.
*G06F 3/06* (2006.01)
*G06F 12/10* (2016.01)
*G06F 12/02* (2006.01)

(52) U.S. Cl.
CPC ............ *G06F 3/064* (2013.01); *G06F 3/0679* (2013.01); *G06F 12/0246* (2013.01); *G06F 12/0292* (2013.01); *G06F 12/10* (2013.01)

(58) Field of Classification Search
CPC ..... G06F 3/0638–064; G06F 12/00–16; G06F 3/0679
See application file for complete search history.

(56) References Cited

U.S. PATENT DOCUMENTS

| 5,406,529 | A | 4/1995 | Asano | |
|---|---|---|---|---|
| 9,495,288 | B2 | 11/2016 | Cohen | |
| 2007/0016721 | A1* | 1/2007 | Gay | G06F 12/0246 711/103 |
| 2010/0172180 | A1* | 7/2010 | Paley | G06F 12/0246 365/185.12 |
| 2012/0150527 | A1 | 6/2012 | Creedon et al. | |
| 2012/0246397 | A1 | 9/2012 | Nakai et al. | |
| 2018/0275873 | A1 | 9/2018 | Frid et al. | |
| 2018/0349041 | A1* | 12/2018 | Zhou | G06F 12/0897 |

FOREIGN PATENT DOCUMENTS

| CN | 102667739 A | 9/2012 |
|---|---|---|
| CN | 104346287 A | 2/2015 |
| EP | 2838026 A2 | 2/2015 |

* cited by examiner

*Primary Examiner* — Nicholas J Simonetti
(74) *Attorney, Agent, or Firm* — Patterson & Sheridan, LLP; Steven H. Versteeg

(57) ABSTRACT

In one or more embodiments, a NAND-based data storage device includes a device controller configured to receive a memory write command from a host specifying a set of memory locations to be written to, and to determine whether the command is for a random write. In response to the determination, the device controller is further configured to configure one or more update entries to an update layer of a mapping architecture of the device for the set of memory locations, such that the one or more update entries are respectively aligned with a size of a pre-defined MRU of mapping data for the device. By aligning the update entries with the smaller MRU, smaller regions of memory may be flagged as obsolete, increasing efficiency. In one embodiment, the device controller further includes a RAM, and the update layer is stored in the RAM.

20 Claims, 4 Drawing Sheets

APPARATUS FOR OBSOLETE MAPPING COUNTING IN NAND-BASED STORAGE DEVICES

BACKGROUND OF THE DISCLOSURE

Field of the Disclosure

Embodiments of the present disclosure generally relate to apparatus and methods for obsolete mapping counting in NAND-based storage devices.

Description of the Related Art

NAND-based storage devices use logical-to-physical (L2P) mapping, and management tables that include control data for dynamic mapping. While the management tables are generally stored in flash memory, copies of portions these tables may also be stored in random access memory (RAM), such as may be provided in a storage device's controller.

L2P mapping for a storage device may be implemented using an address mapping architecture. One such architecture, a dual-layered mapping architecture, includes a master layer ("mLayer") and an update layer ("uLayer"). While the size of the mLayer is relatively large, and its structure regular, for example a direct-access array, the size of the uLayer tends to be much smaller, with a less regular structure. Thus, mapping the same logical block addressing (LBA) range may have different sizes at different times.

In general, a mLayer space is divided into parts named mSets. The mLayer, and thus all of the mSets, are generally saved in flash memory. Additionally, for reasons of efficiency, portions of an mSet may be read into RAM for file translation purposes. On the other hand, the uLayer is generally allocated a limited amount of RAM, and has a constant size, regardless of the given storage device's capacity. The uLayer is divided into regions, and is used to aggregate latest updates in these regions, and consolidate them to an mSet in the event of region overflow.

Each uLayer entry, sometimes referred to as an "uRun," refers to one of those regions, and includes a flag that indicates whether all previous mappings for the region described by the entry are resolved as obsolete. The resolution of obsolete mappings is important for the operation of a NAND-based storage device, as it allows the storage device to free a full block of flash memory that is obsolete (e.g., that has been superseded by a more current version of the data) without needing to relocate any data in it. Because the flag that indicates a region is resolved as obsolete is set for an entire uRun, and thus an entire region described by the uRun, there is no way to mark only a portion of an uLayer region as obsolete-resolved. This causes those portions of the region that are in fact obsolete not to be freed, even if they comprise a very large portion of the entire region. This degrades performance and efficiency.

SUMMARY OF THE DISCLOSURE

The present disclosure generally presents apparatus and methods for obsolete mapping counting in NAND-based storage devices. In one or more embodiments, a NAND-based data storage device includes a device controller configured to receive a memory write command from a host specifying a set of memory locations to be written to, and to determine whether the command is for a random write. In response to the determination, the device controller is further configured to configure one or more update entries to an update layer of a mapping architecture of the device for the set of memory locations, such that the one or more update entries are respectively aligned with a size of a pre-defined MRU of mapping data for the device. By aligning the update entries with the smaller MRU, smaller regions of memory may be flagged as obsolete, increasing efficiency. In one or more embodiments, the device controller further includes a RAM, and the update layer is stored in the RAM.

In one embodiment, the device controller is further configured to determine whether all previous mappings for the memory locations described by an update layer entry are resolved as obsolete, and, in response to the determination, set an obsolete flag of the update layer entry.

In another embodiment, a non-volatile storage device includes a NAND-based storage, in which is stored a master layer of a L2P mapping architecture, and a device controller including a RAM, wherein an update layer of the L2P mapping architecture is stored in the RAM. In response to a write command received from a host, the device controller is configured to translate logical addresses of the write command to physical addresses in the NAND-based storage, and generate one or more entries to the update layer indicating a mapping of the logical addresses to the physical addresses, and align the one or more entries with a size of a MRU of the device.

In another embodiment, an apparatus includes means for receiving a write command from a host, means for determining if the write command is a random write, and means for translating logical addresses of the write command to physical addresses of NAND-based storage means coupled to the apparatus. In such embodiment, the apparatus further includes means for generating one or more entries to an update layer of a L2P mapping architecture for the NAND-based storage means, the one or more entries indicating a mapping of the logical addresses to the physical addresses, and means for aligning the one or more entries with a pre-defined size of a MRU of the device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure presents apparatus and methods for obsolete mapping counting in NAND-based storage devices. In one or more embodiments, a non-volatile data storage device includes a device controller configured to receive a memory write command from a host specifying a set of memory locations to be written to, and to determine whether the command is for a random write. In response to the determination, the device controller is further configured to configure one or more update entries to an update layer of a mapping architecture of the device for the set of memory locations, such that the one or more update entries are respectively aligned with a size of a pre-defined MRU of mapping data for the device. In one embodiment, the device controller further includes a RAM, and the update layer is stored in the RAM.

In one or more embodiments, a boundary of a region of an update layer of a L2P mapping architecture is aligned with a size of a minimum read unit ("MRU") of a master layer of the mapping architecture. In one or more embodiments, this allows obsolete resolution of the region in physical memory described by the update layer region. In one or more embodiments, the size of the MRU is determined by a minimum coverage size for an error correction code applied to mapping architecture data.

Figure 1:
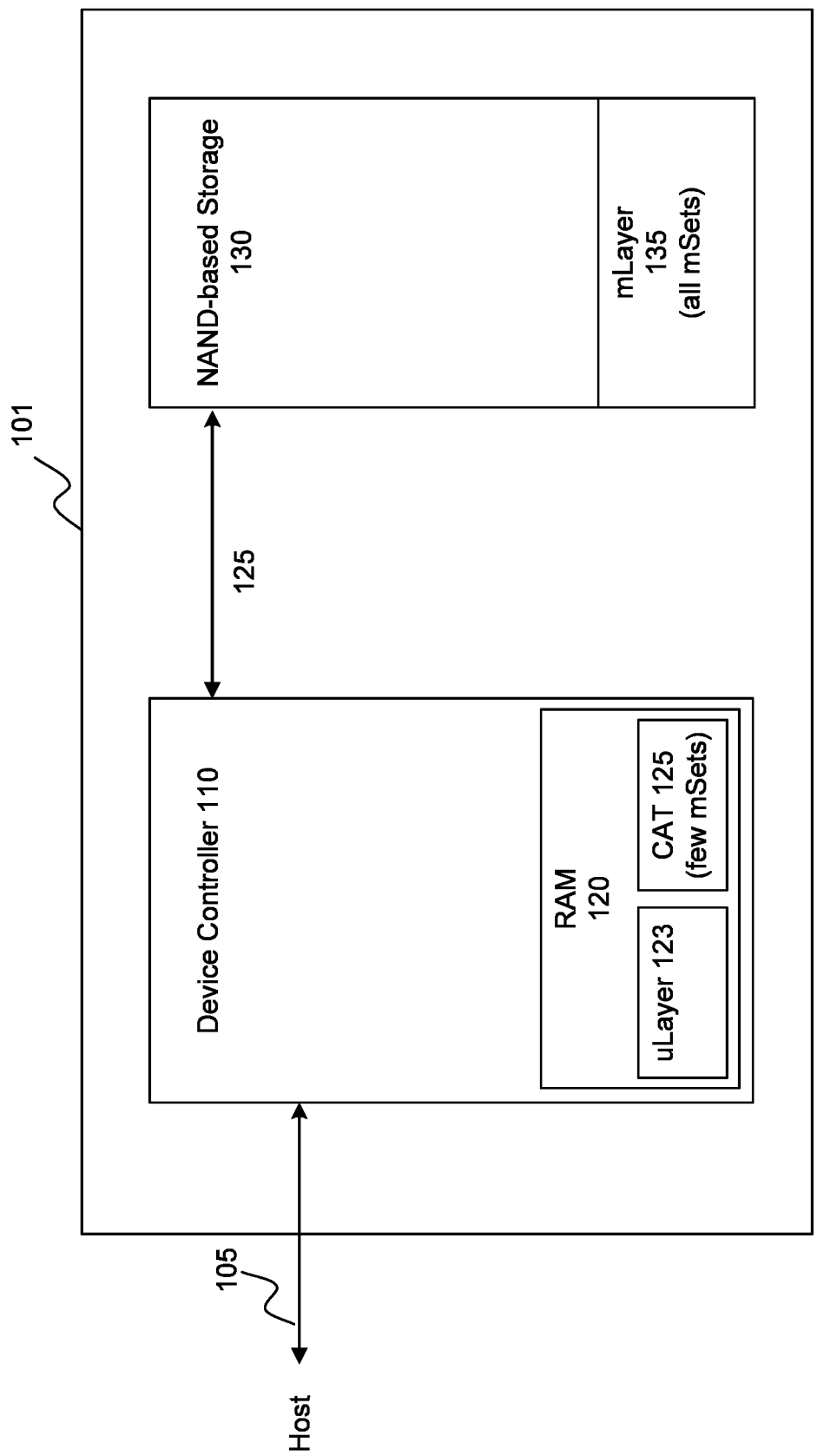
FIG. 1 is an example NAND-based storage device, in accordance with embodiments disclosed herein.

FIG. 1 is an example NAND-based storage device 101, in accordance with various embodiments. In some embodiments, storage device 101 may be, for example, a solid state device (SSD). In other embodiments, storage device 101 may be a flash drive, or a memory card. Storage device 101 includes device controller 110 and NAND-based storage 130, which communicate over communications and data link 125. Device controller may receive read and write commands, including data to be written, from a host, over communications and data link 105. Device controller 110 also includes RAM 120, described in more detail below. RAM 120 may have a size, for example, of from tens of KBs for economical uniform serial bus (USB) disks, to multiple gigabytes (GBs) for high-end high capacity SSD devices. In some embodiments, device controller may additionally access and utilize other RAM (besides, or in place of, RAM 120) that is outside device controller 110, which device controller may use, in such embodiments, instead of, or in addition to, RAM 120.

In one or more embodiments, storage device 101 uses L2P mapping, described above. To implement the L2P mapping, storage device 101 may use management tables provided with control data for dynamic mapping. In one or more embodiments, storage device 101 may include a mapping architecture to implement the L2P mapping. In such embodiments, the mapping architecture may be dual-layered, and may include a management layer, mLayer 135, stored in NAND-based storage 130, and an update layer, uLayer 123, stored in RAM 120 of device controller 110, or, as noted above, in other RAM provided outside of device controller 110, which device controller 110 may access and utilize. In one or more embodiments, mLayer 135 may be a direct-access array that includes, for each logical block address ("LBA"), a corresponding physical address within non-volatile storage 130. In one or more embodiments, uLayer may be range based, of size, for example, from 256K or less to a few megabytes, or even more. While mLayer 135 has an entry for every memory address in the memory space of non-volatile storage 130, uLayer, being stored in device controller RAM 120, which may be not large, can only store limited numbers of entries.

In one or more embodiments, mLayer 135 may be divided into 32 KB parts named mSets. The mLayer 135, and thus all of the mSets which comprise it, are saved in their entirety in flash memory. However, it is noted, for efficiency reasons, portions of an mSet may be read for file translation purposes. For example, a 4 KB portion of an mSet may be read by device controller 110, and thus loaded into RAM 120. In one or more embodiments, uLayer 123 is divided into regions, and is used to aggregate the latest updates in the regions, and consolidate those latest updates to an mSet in the event of region overflow.

Each uRun includes a flag that indicates whether all previous mappings for the memory region of non-volatile storage 130 described by the uRun are resolved as obsolete. The complete resolution of obsolete mappings is important, as it allows a storage device to free a full block of flash memory that is obsolete (e.g., has been superseded by a more current version of the data) without needing to relocate any of it. It is noted that flash memory devices cannot write to the same memory location twice. Rather, a location, once written to, must be erased before it may be written to a second time. Moreover, NAND-based flash memories are composed of blocks, each block comprising several pages. A page may be 16 KB or 4 KB in size, and a block may contain, for example, 256 or more pages. As a simple example, a NAND-based flash memory may include a number of 1024 KB blocks, where each block includes 256 4 KB pages. Data may be written to the 4 KB page, but to erase any page the entire block in which it is located must be erased. Thus, it is important to track how many pages in a block are obsolete, and are ready to be erased. A block with a vast majority of obsolete pages may then be erased, after the data in any non-obsolete pages first having been rewritten to other pages, in other blocks. Thus, to be most efficient, a flash memory controller needs to identify and tag obsolete pages.

As noted above, conventionally uRuns do not cross an mSet boundary (e.g., 32 KB) for the sake of easy consolidation. However, as noted, because the obsolete resolving flag is set for an entire uRun, and not just a portion of it, this condition is not efficient. Thus, in one or more embodiments, with some exceptions, an uRun does not cross a boundary larger than a pre-defined fraction of an mSet, namely that fraction of the mSet that is the MRU of the mSet. For example, in some embodiments an mSet may be 32 KB in size, and, in those embodiments, device controller 110 may be able to read a 4 KB portion of any mSet at any time, without loading the entire mSet into RAM 120. For reasons described in detail below, in one or more embodiments, an uRun is aligned with, or said to be "cut at" this MRU boundary, which, as noted, may be a fraction of an mSet. In some example embodiments, the MRU it may be $\frac{1}{8}^{th}$ of the size of the mSet. In one or more embodiments, the size of a MRU, and thus the fraction that it bears to an mSet, is device specific, and varies As noted above, the L2P mapping maps each logical memory location to a physical memory location. In embodiments, the mLayer may, for example, take the form of an array of physical locations, or physical block addresses (PBAs), indexed by the corresponding logical locations, or logical block addresses (LBAs). The array may, for example, may have the following form: mLayer[LBA]=PBA. On the other hand, uLayer, for example, may use a form of range mapping, as follows: (startingLBA, length)→startingPBA. In other embodiments, various other mapping structures may be used, such as, for example, a hash table where a key is equal to the LBA, and a value is equal to the PBA.

In embodiments, when the host sends a write command and the data to write pursuant to the command, device controller 110 determines which physical block of the flash to write it to, writes that data to the flash and then stores mapping data in a uLayer indicating the mapping of the logical addresses of that newly written data (supplied by the host) to the physical addresses in memory that it now occupies (determined by the storage device). At some later point in time the device controller merges the mapping—now only stored in uLayer—to the relevant mSet in mLayer 135, stored in the flash (or possible the CAT, described below).

Continuing with reference to FIG. 1, RAM 120 may further store a cached address table (CAT) 125. CAT 125 may contain only a few of the mSets of mLayer 135. In embodiments, device controller 110 loads mSets from NAND mLayer 135, or, for example, if the NAND mLayer 135 does not contain them, it may create new ones, and store them in CAT 125. Further, for mSets in CAT 125, device controller 135 merges mapping data into them from an uLayer, and then may update the mapping during write operations, or find it during reads. Ultimately the mapping data is saved back into NAND mLayer 135.

Further, in embodiments, MRUs are read from mLayer 135 into CAT 125 by device controller 110.

Figure 2:
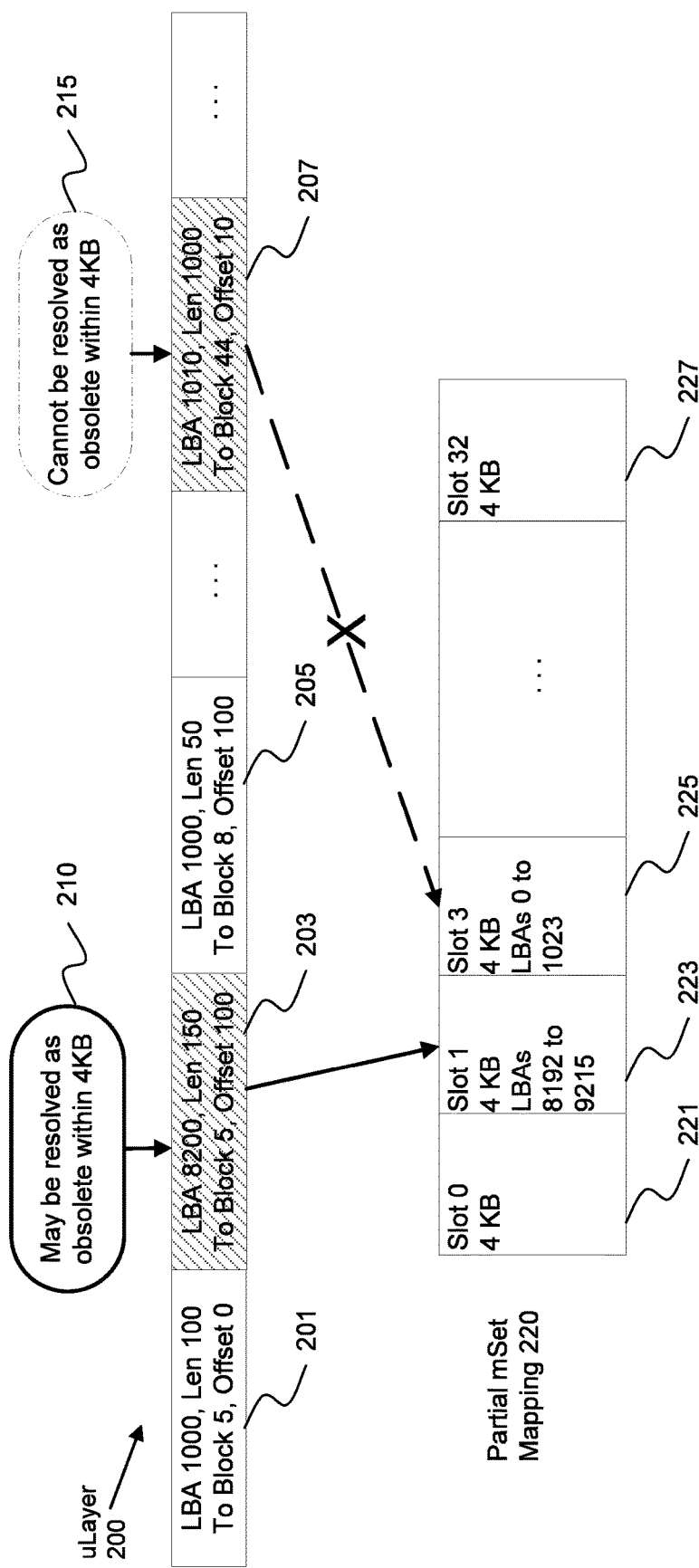
FIG. 2 illustrates an example conventional mapping of uRuns of an example uLayer to a partial mSet mapping.
Figure 3:
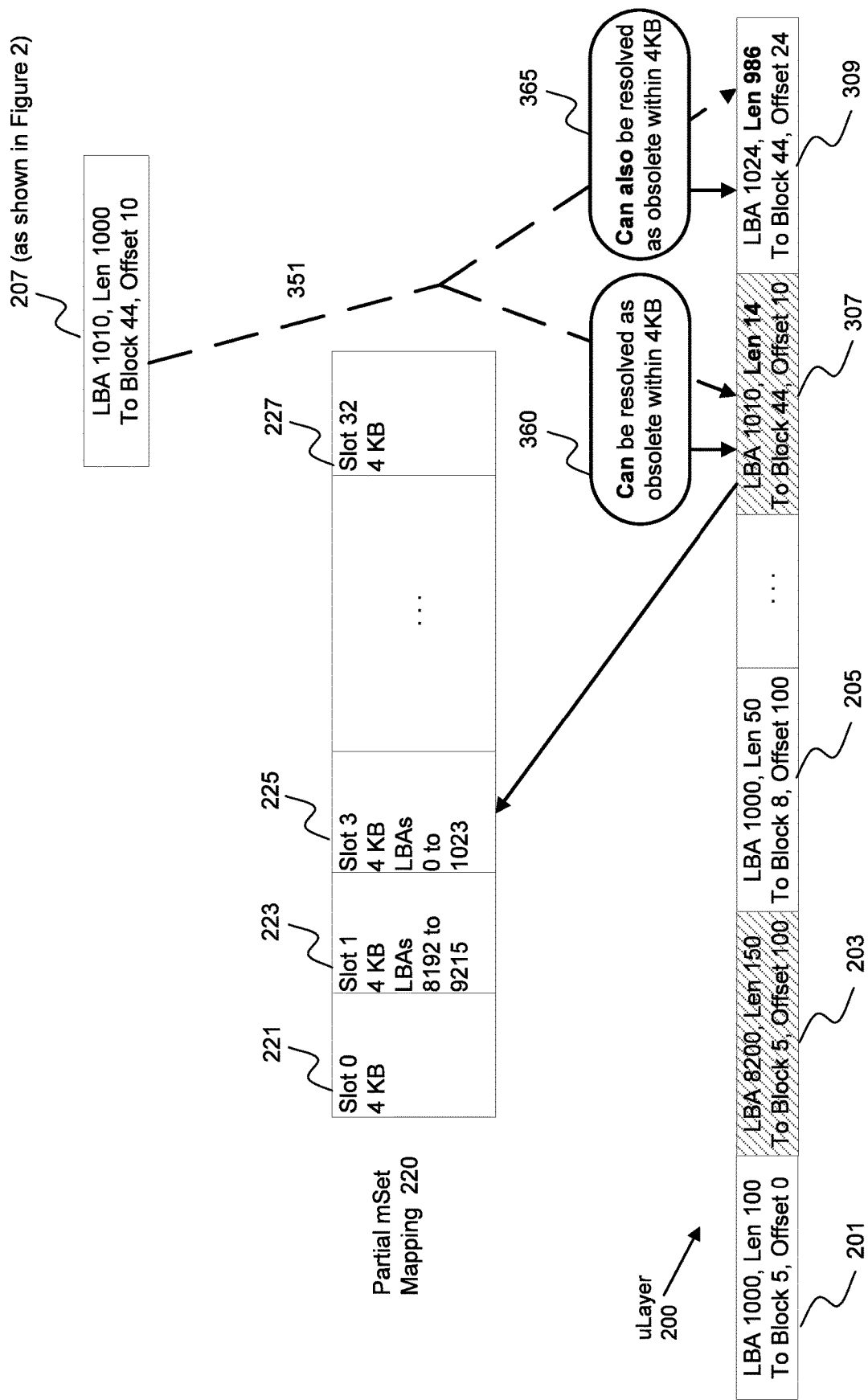
FIG. 3 illustrates a modified version of the example mapping of FIG. 2, in accordance with embodiments disclosed herein.

Next described, with reference to FIGS. 2 and 3, are benefits of aligning an uRun with the size of the MRU of the storage device, as opposed to the size of the minimum write unit, which is generally the size of a full mSet. Thus, in the example embodiment described above, an uRun is aligned with a 4 KB MRU as opposed to a 32 KB complete mSet.

FIG. 2 illustrates an example conventional mapping of example uRuns of an example uLayer 200 to a partial mSet mapping 220. With reference thereto, uLayer 200 includes, as shown, uRuns 201, 203, 205 and 207. As shown, each uRun includes a logical block address (LBA), and a length of data (in address locations), as well as a physical location where that data is stored in non-volatile memory. For example, uLayer 200 may be one example of uLayer 123 of FIG. 1, which maps logical addresses used by a connected host, to physical locations in NAND-based storage 130. As shown, in each of uRuns 201, 203, 205 and 207, the physical memory location is specified by a block number and an offset. In one or more embodiments, uRuns 201, 203, 205 and 207 may each be generated pursuant to a write command received by a storage device from a host.

Also shown in FIG. 2 is partial mSet mapping 220, which is a portion of an example mLayer of an example storage device, in accordance with various embodiments. For example, partial mSet mapping 220 may be an example portion of mLayer 135 of FIG. 1, stored in NAND-based storage 130. As shown, partial mSet 220 mapping has 33 slots, from Slot 0 through Slot 32, four of which are shown, namely Slot 0 221, Slot 1 223, Slot 3 225 and Slot 32 227. A slot is an mSet or MRU content in the CAT together with relevant control data, such as, for example, slot_id, busy flag, mSet id residing within the slot, etc.) Thus, the slots contain MRUs or entire mSets, Continuing with reference to FIG. 2, in uLayer 200 two example uRuns are shown as shaded, namely uRun 203 and uRun 207, to illustrate alignment of uRun data ranges and their effects. With reference to uRun 203, it indicates a mapping of data that begins at LBA 8200, and has length of 150 (shown in uRun 203 as "Len 150"), which is mapped to physical memory Block 5, offset 100. To merge this into the mSet that describes this portion of the logical memory space, uRun 203 is, as shown, merged into Slot 1 223, which covers LBAs 8192 to 9215, which includes LBA 8200. Moreover, because the length of the data described in uRun 203 is only 150 memory locations, the mapping of the chunk of data described by uRun 203 may begin at LBA 8200 and end at LBA 8350, and thus will not extend beyond the 4 KB size of Slot 1 223, which ends at LBA 9215.

Thus, if and when the data referred to by uRun 203 becomes obsolete, it may be resolved as obsolete by a controller of the storage device, e.g., device controller 110 of FIG. 1, within the 4 KB size of Slot 1 223, and then, at that time, the flag of uRun 203 may then be set to so indicate, even if the only portion of the mSet that is read by the storage device at the time is the 4 KB of Slot 1. As noted above, in one or more embodiments, a device controller may read only a portion of an mSet. In one or more embodiments, that may be as small a fraction of the mSet as the MRU. Thus, in one or more embodiments, an uRun is configured to align the data it describes with the size of the MRU, as opposed to the size of an mSet. As a result, if only a MRU of an mSet is read into RAM of a device controller, the data described in that MRU may be resolved as obsolete, without any need to load more of, or the entire, relevant mSet. This is indicated above uRun 203 by label 210, which states that the data described in uRun 203 may be resolved as obsolete within 4 KB. Thus, in embodiments, when a new write occurs, it creates a new uRun in uLayer 200 whose obsolete flag is not set until the entire uRun is merged into a corresponding mSet, or, in one or more embodiments according to the present disclosure, in a corresponding MRU. This can happen, for example, immediately after the write, if the mSet is currently loaded into the CAT, or, for example, if not, then when the uLayer is being consolidated, which will force the mSet to be loaded into RAM 120 of FIG. 1, such as, for example, in CAT 125 of FIG. 1.

On the other hand, as shown at uRun 207 of FIG. 2, the data described in uRun 207 is not aligned with the 4 KB boundary of Slot 3 225. This is for two reasons. First, Slot 3 225 covers LBAs 0 to 1023, and the LBA described in uRun 207 is LBA 1010, near the end of the range of the LBAs of Slot 3 225. Moreover, the length of the data described in uRun 207 is 1000 memory locations. This is somewhat rare for a random write command, as seen by comparison with the lengths shown in uRuns 201, 203 and 205. In general, the length of a random write tends to be shorter. Due to the length of the data to be written to memory, starting at LBA 1010 and running for 1000 memory locations the mapping data of uRun 207 exceeds the 4 KB size of Slot 3 225, which has only 14 remaining memory locations to the end of its range, which is at LBA 1023. As a result, if just Slot 3 225 of the relevant mSet were to be read by a controller of the storage device, in a MRU read, because the data is not wholly described by the mapping data of Slot 3 225, no flag could be set resolving that data as obsolete, and it could not be erased—even if all of the data was in fact obsolete. This inability to resolve as obsolete is shown by label 215, outlined in a "dot-dash" line, and by the dotted arrow with an "X" superimposed on it, connecting uRun 207 to Slot 3 225. In one or more embodiments, this problem is solved by changing the configuration of an uRun entry, as next described with reference to FIG. 3.

FIG. 3 illustrates a modified version of the example mapping of FIG. 2, in accordance with embodiments disclosed herein. With reference thereto, Partial mSet mapping 220 is the same as shown in FIG. 2 and described above, as are uLayer entries uRuns 201, 203, 205 and 207. uLayer 200 is now shown in FIG. 3 at the bottom of the figure, although former uRun 207 is shown in the same place as it was in FIG. 2. These elements are repeated in FIG. 3 for context, and are not described again here. In the example shown in FIG. 3, former uRun 207 has been split into two pieces, shown by dashed arrow 351, the replacement uRuns being, as shown, uRun 307 and uRun 309, which are shown at the end of revised uLayer 200. As described above, uRun 207, due to the position of its LBA relative to the boundary of Slot 3 225, and its length of 1000, exceeds the 4 KB boundary of Slot 3, and thus cannot be resolved within the 4 KB minimum readable size of a portion of an mSet in this embodiment. Accordingly, as noted, uRun 207 has now been split into two uRuns, both of which align with the MRU. The first replacement uRun 307 begins at the same LBA (1010), but now has its length truncated to 14. Because Slot 3 225 ends at LBA 1023, uRun 307 now covers the memory space of LBAs 1010 through 1023, which perfectly aligns with the boundary of Slot 3 225. As a result, the memory locations described in replacement uRun 307 can now be fully resolved within 4 KB, as shown by label 360.

Continuing with reference to FIG. 3, the remainder of the mapping data of former uRun 207 is placed in a new uRun, uRun 309, which begins at LBA 1024. LBA 1024 is the next available LBA following the last LBA of Slot 3, and because in this example each Slot has 1024 LBAs, it will be mapped in an mSet slot containing LBAs 1024 through 2047 (not shown). Given that replacement uRun retained 14 memory locations of its original 1000, new uRun 309 has the remainder, and thus a length of 986 memory locations. In this example, where the MRU is 4 KB, and, given an example 32 bit memory address (4 bytes), a MRU or mSet Slot can contain mapping data for 1024 memory locations (=4 KB). Thus uRun 309, which will be merged into a new slot whose LBA range begins at LBA 1024, can hold data for all 986 locations of uRun 309, and thus will also be resolvable within a 4 KB slot, or MRU. This is noted by label 365, which states that new uRun 309 can also be resolved within 4 KB.

Figure 4:
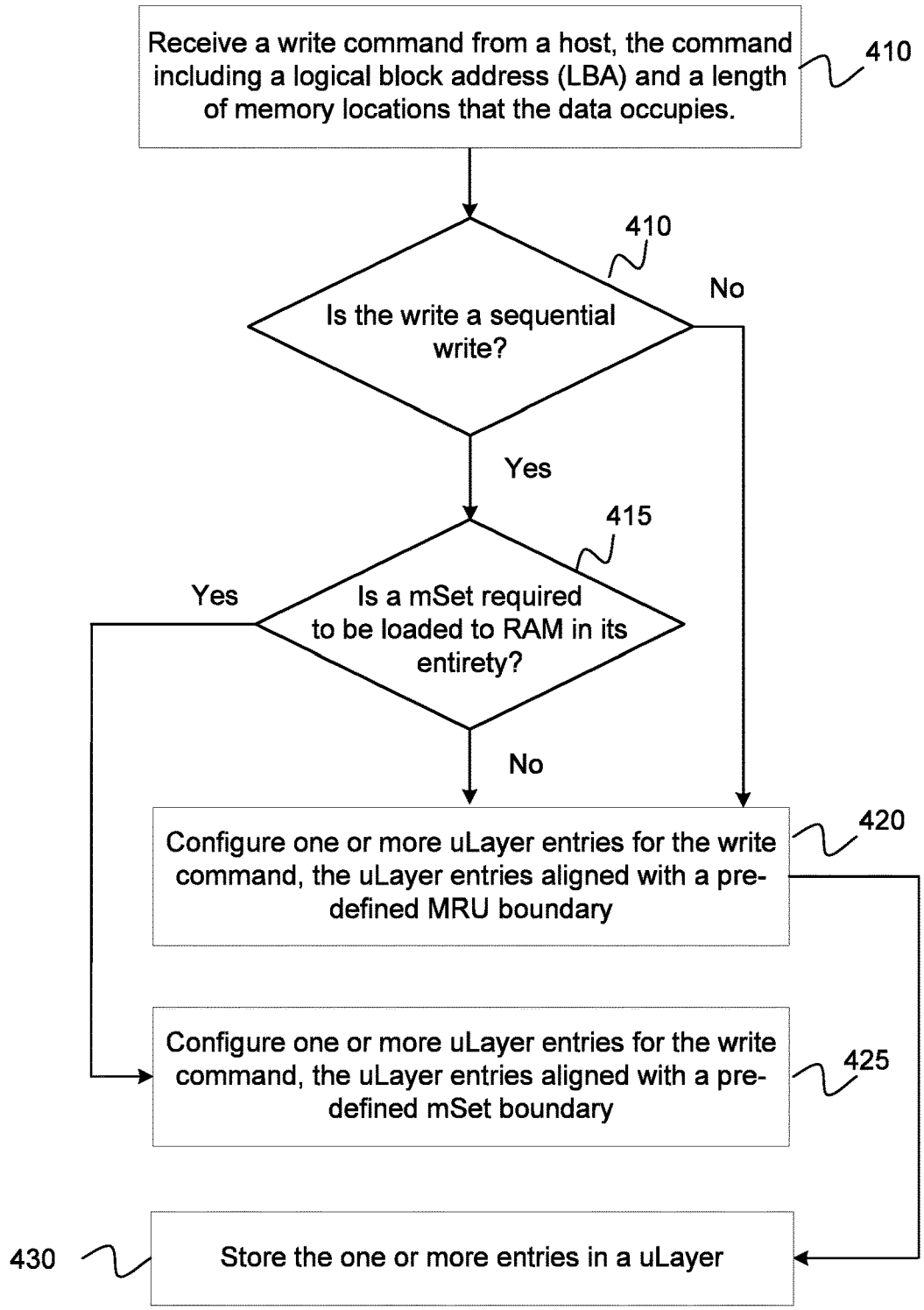
FIG. 4 depicts an embodiment of a method of configuring uLayer entries, in accordance with embodiments disclosed herein.

FIG. 4 depicts an embodiment of a method 400 of configuring uLayer entries, in accordance with embodiments disclosed herein. With reference thereto, method 400 is shown as including blocks 405 through 430. In alternate embodiments, method 400 may be implemented in more or less blocks.

Beginning at block 405, a write command is received from a host, the command including a LBA and a length of memory locations that the data occupies. For example, the command may be received by a controller of a storage device, such as, for example, device controller 110 of FIG. 1, and, for example, the command may direct a write of data into 1000 memory locations, beginning at LBA 1010, as described in uRun 207 of FIG. 2.

From block 405, method 400 proceeds to block 410, where it is determined if the write command is for a sequential write. This is because when an SSD is writing large amounts of data sequentially, the entire block is filled sequentially with data related to the same file. If it is later determined that the file is to be replaced or deleted, the entire block can be marked as invalid, and there is no need to read parts of it to garbage collect and rewrite into another block. It will need only to be erased, which is much easier and faster than the read-erase-modify-write process needed for randomly written data going through garbage collection. Thus, there is no reason to read a MRU of an mSet where the data stored in it was consecutively written. It is here noted that in a sequential mapping a "large" number of subsequent LBAs are mapped to subsequent PBAs. Thus, a sequential host workload (e.g., a workload that a "large" number of subsequent LBAs are requested to be written in their native order) usually leads to sequential mapping. In embodiments, the device controller can determine sequential host workloads and mark the relevant write requests with a special flag. Or, alternatively, even if lacks such an ability, firmware could determine that on its own Continuing with reference to FIG. 4, if the response at block 410 is "Yes", and thus the write is sequential, method 400 then proceeds to block 415, next described. However, if the response at block 410 is "No", and thus the write is random, then method 400 proceeds directly to block 420.

Returning now to block 415, it is determined if, under prevailing protocols, an mSet is required to be loaded to RAM in its entirety. This tests for whether in the given device, at the time method 400 is run, there is no such concept as a MRU different than the size of a full mSet. Under such conditions, the uRun is simply aligned to the mSet boundary. Thus, if the response at block 415 is "Yes", then method 400 proceeds to block 425, where one or more uLayer entries are configured for the write command, the uRuns aligned with the mSet boundary.

From block 425, method 400 proceeds to block 430, where the one or more entries are stored in an uLayer of the device.

However, if the response at block 415 is "No", then method 400 proceeds to block 425, where one or more uLayer entries are configured for the write command, the uLayer entries aligned with a pre-defined MRU boundary. For example, in a device or system where a device controller may read a fractional portion of a mSet, such as, for example, a 4 KB slot as shown in FIG. 2, then a uRun is aligned with that fractional portion of a mSet, as data within the uLayer entry may then be fully resolved as obsolete within the size of that fractional portion.

From block 420, as was the case following block 425, method 400 proceeds to block 430, where the one or more entries are stored in an uLayer of the device.

It is noted that one or more embodiments according to the present disclosure may be applied to any NAND-based storage device that retains information about delayed update of valid counters in the Update Layer (uLayer), and that also reads fractional parts of mSets for translation.

One or more embodiments according to the present disclosure may be implemented in a file translation layer (FTL) of a NAND-based storage device. Such embodiments are not dependent upon any specific structure of an uLayer, but rather, any device that retains information about delayed update of valid counters in the uLayer, and that also reads fractional parts of mSets for translation, may benefit.

It is further noted that implementing one or more embodiments according to the present disclosure in a device may reduce overhead of searching previous locations and also avoid compaction as much as possible. One or more embodiments may be implemented in relatively low-RAM devices that use delayed searching of a previous location for tracking obsolete mapping.

In one or more embodiments, a NAND-based storage device implements a L2P mapping architecture that has a master layer and an update layer. In such embodiments, an update layer unit (uRun) of the L2P mapping architecture is aligned with a MRU of a unit (mSet) of a master layer (mLayer) of the mapping architecture. In one or more embodiments, this allows obsolete resolution of the region in physical memory described by the uRun. In one or more embodiments, a device controller of the non-volatile storage device receives a write command from a connected host, and determines what type of write is indicated. For a random write workload, uRuns are configured as per a MRU boundary rather than on the size of an entire mSet. This allows obsolete mapping resolving when merging any multiple of such minimal mLayer reading boundary sized subset of an mSet. On a sequential write workload, uRuns are not cut if the mSet is always loaded in its entirety. However, if the mSet is not always loaded in its entirety, then a sequential write command is treated in similar fashion to the random write command. In one or more embodiments, a device controller is further configured to determine whether all previous mappings for the memory region described by an update layer entry (configured to the size of an MRU) are resolved as obsolete, and, in response to the determination, set a data obsolete flag of the update layer entry.

While the foregoing is directed to embodiments of the present disclosure, other and further embodiments of the disclosure may be devised without departing from the basic scope thereof, and the scope thereof is determined by the claims that follow.

What is claimed is:

1. A NAND-based data storage device, comprising:
a device controller configured to:
receive a memory write command from a host specifying a set of memory locations to be written to;
determine that the memory write command is for a random write or a sequential write, wherein the sequential write is part of a master layer (mLayer) that is not to be loaded to random access memory (RAM) in entirety;
determine that one or more update entries for an update layer (uLayer) of a mapping architecture of the device for the set of memory locations fails to align with a size of a pre-defined minimum reading unit (MRU) of mapping architecture data for the device, wherein the mLayer is separate from the uLayer; and
in response to the determination that one or more update entries for the uLayer of a mapping architecture of the device for the set of memory locations fails to align, configure the one or more update entries for the uLayer of the mapping architecture of the device for the set of memory locations, such that the one or more update entries are respectively aligned with a size of the MRU of mapping architecture data for the device, wherein the configuring comprises modifying the one or more update entries such that the modified one or more update entries are aligned with the size of the pre-defined MRU.

2. The data storage device of claim 1, wherein the device controller further comprises the random access memory (RAM), and wherein the uLayer is stored in the RAM.

3. The data storage device of claim 1, wherein the mapping architecture of the device is a logical to physical (L2P) mapping architecture further comprising a mLayer, the mLayer comprising a set of master layer units (mSet), each mSet including a mapping for a pre-defined number of memory locations of the device, and wherein the size of the MRU is less than a pre-defined size of the mSet.

4. The data storage device of claim 3 wherein the size of the MRU is equal to the size of a logical page defined for the NAND-based storage device.

5. The data storage device of claim 3, wherein the device controller is further configured to read a portion of the mSet equal in size to any multiple of the size of the MRU.

6. The data storage device of claim 3, wherein a ratio of the size of the MRU to the pre-defined size of the mSet is a regular fraction whose numerator and denominator are both powers of 2.

7. The data storage device of claim 1, wherein the mapping architecture is a logical to physical (L2P) mapping architecture, and wherein a mLayer of the L2P mapping architecture is stored in the NAND-based storage, the mLayer comprising a set of master layer units (mSet), each mSet including a mapping for a pre-defined number of memory locations of the device.

8. The data storage device of claim 7, wherein the device controller further comprises the RAM, the RAM storing a cached address table (CAT) into which the MRU is read from the mLayer.

9. The data storage device of claim 7, wherein the device controller is further configured to:
determine whether a fraction of the mSet may be read by the device, and in response to the determination, configure one or more update entries for the uLayer of the mapping architecture of the device for the set of memory locations, such that the one or more update entries are respectively aligned with the size of the MRU of the mapping architecture for the device.

10. The data storage device of claim 1, wherein the update layer entries each include an data obsolete flag, and wherein the device controller is further configured to determine whether all previous mappings for the memory location described by an update layer entry are resolved as obsolete, and, in response to the determination, set the data obsolete flag.

11. A non-volatile storage device, comprising:
a NAND-based storage, in which is stored a master layer of a logical to physical (L2P) mapping architecture; and
a device controller including a random access memory (RAM), wherein an update layer of the L2P mapping architecture is stored in the RAM;
wherein, in response to a write command received from a host, the device controller is configured to:
determine that the write command is for a random write or a sequential write, wherein the sequential write is part of a master layer (mLayer) that is not to be loaded to random access memory (RAM) in entirety;
translate logical addresses of the write command to physical addresses in the NAND-based storage;
generate one or more entries to the update layer (uLayer) indicating a mapping of the logical addresses to the physical addresses; determine that the one or more entries for the uLayer fails to align with a size of a pre-defined minimum reading unit (MRU) of mapping architecture data for the device, wherein the mLayer is separate from the uLayer; and
align the one or more entries with a size of the MRU of the device, wherein the aligning comprises modifying the one or more update entries such that the modified one or more update entries are aligned with the size of the pre-defined MRU.

12. The non-volatile storage device of claim 11, wherein the mLayer of the L2P mapping architecture includes master layer units (mSet) of a pre-defined size, and wherein the size of the MRU of the device is less than the size of the mSet.

13. The non-volatile storage device of claim 11, wherein the MRU of the device refers to a number of memory locations equal to those included in a logical page defined for the NAND-based storage.

14. The non-volatile storage device of claim 11, wherein the master layer of the L2P mapping architecture includes a set of mSet, each mSet having a pre-defined size.

15. The non-volatile storage device of claim 14, wherein a ratio of the pre-defined size of the MRU to the pre-defined size of the mSet is a regular fraction whose numerator and denominator are both powers of 2.

16. The non-volatile storage device of claim 11, wherein the device controller is further configured to, prior to generating the one or more entries, determine if the write command is for a random write.

17. The non-volatile storage device of claim 11, wherein the device controller is further configured to save the one or more generated entries to the uLayer in the RAM.

18. An apparatus, comprising:
  means for receiving a write command from a host;
  means for determining if the write command is a random write or a sequential write, wherein the sequential write is part of a master layer (mLayer) that is not to be loaded to random access memory (RAM) in entirety;
  means for translating logical addresses of the write command to physical addresses of NAND-based storage means coupled to the apparatus;
  means for generating one or more entries to an update layer (uLayer) of a logical to physical (L2P) mapping architecture for the NAND-based storage means, the one or more entries indicating a mapping of the logical addresses to the physical addresses; means for determining that the one or more entries for the uLayer fails to align with a size of a pre-defined minimum reading unit (MRU) of mapping architecture data for the apparatus, wherein the mLayer is separate from the uLayer; and
  means for aligning the one or more entries with a size of the MRU of the apparatus, wherein the aligning comprises modifying the one or more update entries such that the modified one or more update entries are aligned with the size of the pre-defined MRU.

19. The apparatus of claim 18, further comprising the NAND-based storage means, wherein a mLayer of the L2P mapping architecture is stored in the NAND-based storage means, wherein the mLayer includes master layer units (mSet) of a pre-defined size, and wherein the size of the MRU of the apparatus is less than the size of the mSet.

20. The apparatus of claim 18, wherein the uLayer entries each include a data obsolete flag, and further comprising:
  means for determining whether all previous mappings for a memory region described by ones of the one or more entries are resolved as obsolete; and
  means for setting the data obsolete flag in each such entry.

* * * * *